Figure 1:
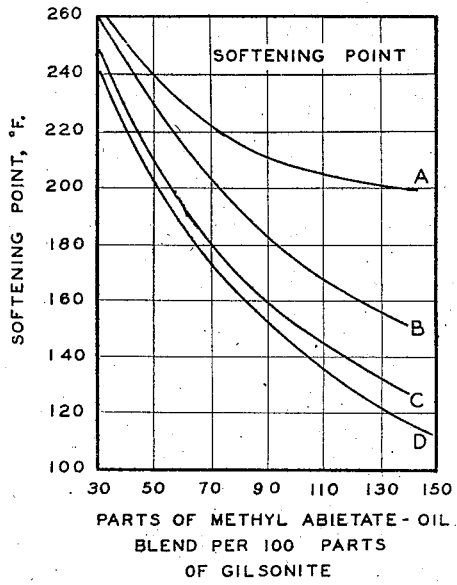

May 22, 1945.  J. S. MILLER ET AL  2,376,797
ASPHALT COMPOSITION
Filed Jan. 19, 1944

CURVE DESIGNATIONS
A  MINERAL OIL ALONE
B  25 METHYL ABIETATE TO 75 MINERAL OIL
C  50 METHYL ABIETATE TO 50 MINERAL OIL
D  75 METHYL ABIETATE TO 25 MINERAL OIL

INVENTORS
JOHN STROTHER MILLER
BY  JOHN L. PRESENT
ATTORNEY

Patented May 22, 1945

2,376,797

UNITED STATES PATENT OFFICE 2,376,797

ASPHALT COMPOSITIONS

John Strother Miller, Rahway, N. J., and John L. Present, Wilmington, Del., assignors to Hercules Powder Company, Wilmington, Del., a corporation of Delaware Application January 19, 1944, Serial No. 518,833

9 Claims. (Cl. 106—234)

This invention relates to bituminous compositions and more particularly it relates to modified asphaltites and impregnation or coating therewith.

In the formulation of the bituminous compositions for molding, saturating, coating, and laminating in the molten state, it is desirable to achieve fair hardness of the composition at temperatures of normal use such as 65°–85° F., freedom from brittleness in the cold, and at the same time to achieve a sufficient fluidity to insure ready molding or impregnation in the molten state. The optimum combination of a satisfactory flexibility in the cold and a desirable fluidity in the molten state for any given normal hardness has not been obtained.

Asphalts generally are too soft for molded articles and the like, where resistance to pressure and low cold flow is important. Asphalt may be hardened by blowing with air or steam, and this treatment is usually given to typical asphalts such as those obtained in the refining of petroleum. However, blowing greatly raises the softening point and thus interferes with efficient molding, coating, and saturating.

Asphaltites, such as gilsonite, are hard but have too high a softening point for efficient molding, coating, or impregnation in the molten state. They may be modified with resins, oils, and greases to lower the softening point, but the accompanying embrittlement by resins and excessive lowering of hardness, increased staining, and destruction of adhesive properties by oils and greases have been unsatisfactory.

Now in accordance with this invention, these disadvantages have been eliminated or greatly diminished by an improved composition prepared by blending gilsonite or other asphaltite with both a mineral oil and a normally liquid ester of a rosin acid in certain limited proportions; namely, the liquid ester of a rosin acid is between about 10% and about 75% by weight of the sum of the oil and the ester, and the sum of the weights of the oil and ester is between about 25 parts and about 150 parts by weight for each 100 parts by weight of the gilsonite or other asphaltite.

Within these ranges are obtained compositions having a useful range of hardness values and a useful accompanying range of softening point values, both properties being controllable, so that compositions with a close adjustment of the desired combination of properties are readily obtained. However, for any given hardness, as measured by the values obtained with a penetrometer, at normal use temperatures, the softening point is at a lower level than in prior practicable compositions. Yet, there is less embrittlement in the cold; there is minimum increase or no increase in the staining power of the asphaltite; and adhesive properties are improved.

The compositions in accordance with this invention are illustrated by specific examples given in Table I.

Table I

| | Examples | | | | | | | | |
|---|---|---|---|---|---|---|---|---|---|
| | 1 | 2 | 3 | 4 | 5 | 6 | 7 | 8 | 9 |
| Gilsonite (grade E) | 100 | 100 | 100 | 100 | 100 | 100 | 100 | 43.5 | 100 |
| Hydrogenated methyl abietate | | | | | | 50 | | | |
| Methyl abietate | 55.5 | 38.5 | 23 | | | | 40 | 20 | 42.3 | 80 |
| Triethylene glycol abietate | | | | 60 | | | | | |
| Mineral oil (No. 7 raven oil) | 18.5 | 38.5 | 69 | 40 | 50 | 40 | 30 | 14.2 | 40 |
| Wood rosin | | | | | | 15 | | | |
| Pine wood resin—50% gasoline insoluble (Belro resin) | | | | | | | 20 | | |
| Coumarone-indene resin | | | | | | | | 20 | |

Examples 1, 2, and 3 are illustrative of variation in the ratio of mineral oil to liquid rosin acid esters. However, softening points and penetration values at 77° F. are much alike for the three compositions represented, the softening points being 171° F., 176° F., and 178° F., respectively, for the three examples, and the penetration values being 18, 18, and 20, respectively. The composition of Example 1 has almost no tendency to cause staining; the composition of Example 2 causes slight staining; and the composition of Example 3 causes somewhat more staining. However, in all cases, the staining is very much less than that caused by compositions of similar hardness in which mineral oil is used as the sole softener.

The compositions of Examples 1, 2, and 3 are suitable for saturating paper. For example, 30-pound kraft paper was passed through molten baths of the compositions at 400° F. and excess asphalt removed by doctor rolls. Substantially immediate saturation occurred. The same compositions were coated on 30-pound kraft paper by means of a roller coater operated at 350° F. A film weighing 25-35 pounds per 3,000 sq. ft. was applied in this manner. Excellent bonding of the film to the paper was obtained. The lower temperature and short time of contact insured a coating rather than complete impregnation of the paper. The kraft paper so coated was laminated to a second ply of uncoated kraft paper by passing the two plies through heated rolls to develop the desired adhesion between plies.

Example 4 illustrates a composition similar to Example 2 but the liquid ester of rosin acid is triethylene glycol abietate. This composition is particularly valuable as an adhesive in lamination. Examples 5, 6, and 7 illustrate further modification with resins. The compositions of Examples 6 and 7 are particularly suitable for molding, especially when a mixture of two parts of clay and one part of short-fibred asbestos is thoroughly mixed into the composition in a quantity of about 25% of the composition.

The composition of Example 8 is particularly useful for saturating roofing material such as roll roofing. This composition has a softening point of 125° F. and a penetration value at 77° F. of 100. It is characterized by very rapid and complete saturation of felts in the molten state. This composition also has the property of decreasing in penetration value and increasing in softening point when blown with air at 450° F. For example, 3400 g. of the composition at 450° F. were blown with air at the rate of 0.8 cu. ft. per minute. The results of this treatment, blowing to various softening points, are shown in Table II.

*Table II*

|  | Sample | | | |
| --- | --- | --- | --- | --- |
|  | Original | 1 | 2 | 3 |
| Softening point, °F | 125 | 151 | 183 | 207 |
| Penetration at— |  |  |  |  |
| 32° F | 40 | 23 | 12 | 9 |
| 77° F | 100 | 52 | 26 | 19 |
| 115° F | 225 | 116 | 58 | 40 |
| Temperature susceptibility factor: |  |  |  |  |
| (A) Low temperature |  |  |  |  |
| Susceptibility factor—penetration 77° F./penetration 32° F | 2.25 | 2.25 | 2.17 | 2.11 |
| (B) Elevated temperature |  |  |  |  |
| Susceptibility factor—penetration 115° F./penetration 77° F | 2.25 | 2.23 | 2.23 | 2.10 |

Table II also gives the temperature susceptibility factor for low temperatures and moderately high temperatures. It will be noted that the susceptibility factors unexpectedly remain substantially constant, low and alike for the compositions. It will also be noted that the hardness of the compositions, as shown by low penetration values at 77° F., is increased by blowing to a greater relative extent than is the softening point.

The compositions in accordance with this invention are prepared from asphaltites which are to be distinguished from asphalt. The use of gilsonite is shown in the examples and is preferred because of its uniformity and because its fusion point is not as high as some of the other asphaltites. However, grahamite, glance pitch or manjak, and the like, may be formulated in a manner similar to that illustrated for gilsonite. The asphaltites are readily distinguished from asphalts of both natural and petroleum refining sources by their greater hardness and higher softening point. Although some of the blown asphalts have softening points approaching the lower melting asphaltites, the asphaltites are harder. Further distinctions are given in Abraham, "Asphalts and Allied Substances," d. Van Nostrand, New York, N. Y., (1938).

Any nonvolatile mineral oil may be used instead of the oil illustrated in the examples. Thus, motor oil, Nujol, white oil, and the like, derived from paraffin base, naphthene base, or asphalt base petroleums, are suitable. The mineral oil should have an initial boiling point in excess of about 390° F., and a flash point (open cup method) in excess of about 350° F.; preferably it should have little or no asphalt content.

In addition to, or in place of, the methyl abietate and triethylene glycol abietate illustrated in the examples, any normally liquid ester of a rosin acid has been found suitable. The rosin acid may be derived from wood or gum rosin and may be a relatively pure acid or mixture of acids, such as abietic acid, d-pimaric acid, l-pimaric acid, sapietic acid, sapinic acid, pyroabietic acid, dehydroabietic acid, dihydroabietic acid, tetrahydroabietic acid, and the like, and may be esterified in the form of the rosin itself. The rosin may be polymerized, dehydrogenated, hydrogenated, heat-treated, or isomerized. The esters of rosin acids with lower aliphatic alcohols, such as methyl alcohol, ethyl alcohol, isopropyl alcohol, butyl alcohol, and hexyl alcohol have been found to be most effective in leading to compositions which are most flexible in the cold for any given hardness. However, liquid esters of higher aliphatic alcohols, such as lauryl alcohol, oleyl alcohol, and stearyl alcohol, serve nearly as well. Liquid esters of polyethylene glycols, such as triethylene glycol, tetraethylene glycol, hexaethylene glycol, and nonaethylene glycol, are also suitable and have been found of particular value in combination with gilsonite and mineral oil in compositions used as adhesives in lamination.

To obtain the desired combination of hardness and softening point, the gilsonite or other asphaltite is modified with the mixture of the liquid ester of rosin and mineral oil to the extent of between about 25 parts and about 150 parts by weight of the mixture for each 100 parts of the asphaltite. Less than 25 parts is insufficient to lower the softening point to an extent insuring easy molding and efficient impregnation or saturation, and elimination of brittleness. More than 150 parts reduces the hardness at normal temperatures excessively. The exact quantity used will depend on the particular softening point and hardness desired and can readily be determined as hereinafter described. The liquid ester of the rosin acid is held between about 10% and about 75% by weight of the sum of the ester and the mineral oil and preferably is between about 50% and about 75%. At least about 10% of ester in the mixture is required to reduce the softening point of the asphaltite effectively. More than 75% eliminates a desirable resilience which mineral oil imparts to the composition. In addition, if the liquid ester of rosin acid is less than 10%, the composition has very serious staining properties. Staining is much less for compositions in which the liquid rosin ester is between about 10% and about 50% of the mixture with oil. At above about 50% of the liquid rosin ester, there is substantially no staining beyond that inherent in the asphaltite.

Adjustment of the properties of a given composition for any intended use is readily controlled over a wide range and is illustrated by the three figures of the drawing. Figure 1 shows graphically the effect on softening point of three different mixtures of mineral oil and methyl abietate when blended in various proportions with grade "E" gilsonite. It also shows the effect of adding mineral oil alone. The oil utilized was a mineral oil known as "No. 7 raven oil." Figure 2 is a graph giving in a similar manner the hardness as indicated by penetration values at 77° F. for the various blends of gilsonite, methyl abietate, and mineral oil, whose softening points are shown in Figure 1.

Figure 2:
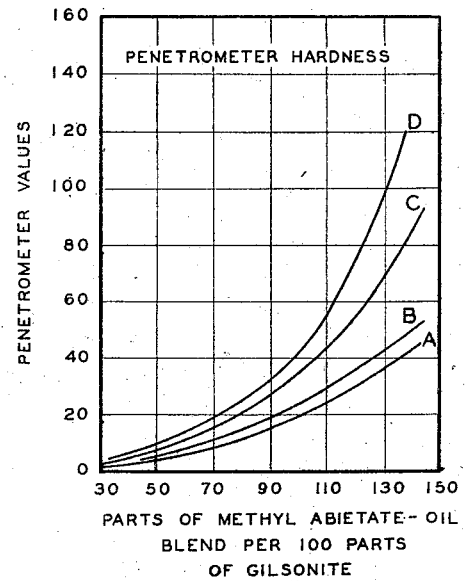
Figure 3:
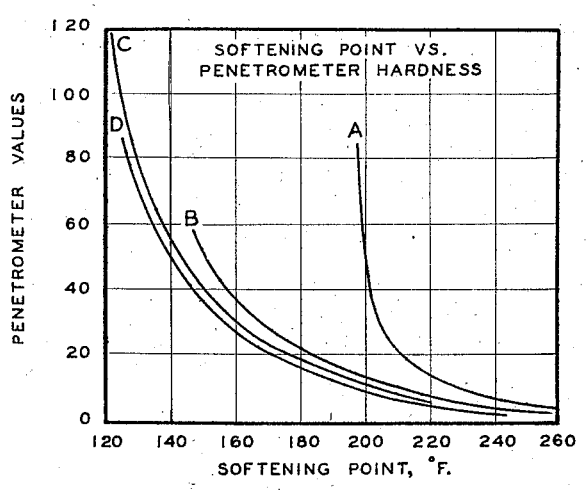

Figure 3 is a graph which shows the relation of hardness shown by penetration value and softening point obtainable at different ratios of methyl abietate to mineral oil. The series of curves clearly shows that at any given hardness (penetration value) the softening point is very much lower for mixtures of the liquid ester of rosin acid and mineral oil than for mineral oil alone. Thus, for any composition of any given hardness, much more effective saturation or impregnation is possible and molding or coating will much more easily be carried out in the molten state or semimolten state. Although Figure 2 shows that the mixtures have a greater effect on the penetration value than does mineral oil alone for a given penetration, the lowering of softening point by the mixture is very much more effective.

The curves of Figures 1 and 2 may be used as a guide in the formulation of compositions having almost any combination of softening point and penetration value. It will be appreciated that other asphaltites and even other gilsonites will not give exactly the same results, since these materials vary considerably.

The compositions in accordance with this invention may be further modified by inclusion of additional softening agents, such as castor oil, dibutyl phthalate, tricresyl phosphate, oleic acid, and the like, if desired. Waxes and waxy materials, such as paraffin, montan wax, ozokerite, carnauba wax, stearic acid, and the like, may also be included. Fillers or pigments, such as clay, calcium carbonate, ground slate, mica, iron oxide, asbestos, wood flour, wood pulp, cotton floc, and the like, may also be included if desired. Such fillers are usually included in molding and trowelling compositions.

As shown by Examples 5, 6, and 7, resins may be included in the compositions. For example, wood rosin, gum rosin, pine wood resin containing in excess of 15% gasoline-insoluble material (particularly containing 35-75% gasoline-insoluble material), coumarone-indene resin, ester gum, polymerized pinene resin, and the like, may be included as a replacement of part of the asphaltite in a quantity up to about 30% of the resulting total of asphaltite and resin. Resins lower the softening point of the asphaltite but in quantities above about 30% of the mixture with the asphaltite they lead to compositions which are unduly brittle at lower temperatures.

The compositions in accordance with this invention are particularly designed for use in the molten or semimolten state. Their greatest value lies in the saturation of sheeting and felts, such as asbestos paper; "felt base" which is a felt of either cellulosic rag fiber, or wool fiber, or both; fiber board; wood pulp board; straw board; bagasse board, and the like. The compositions are characterized by high efficiency of penetration and saturation in such molten impregnation, yet are sufficiently hard at normal temperatures and relatively flexible at low temperatures such as 32° F. Similarly, the compositions are valuable in coating in the molten state; for example, in coating paper, crepe paper, regenerated cellulose film, metal foil, insulating board, and the like, for use as a simple coated sheet or for use as a ply in lamination.

The compositions in accordance with this invention are capable of replacing asphalts and blown asphalts because of their moderate and controllable softening points, yet they are superior to asphalts in having a desirable hardness for a given softening point, and in being much more stable in hardness, softening point, and other properties than a blown asphalt.

Although the compositions according to this invention are chiefly intended for application in the molten state, they are soluble in volatile organic solvents, such as benzene, toluene, high-flash naphtha, petroleum hydrocarbons mixed with aromatic hydrocarbons, carbon disulfide, carbon tetrachloride, and the like, and, accordingly, they may be applied in solution in such solvents in coating operations.

All penetration values given herein are by the standard A. S. T. M. method D5-25 using a 100-g. weight for five seconds at a temperature of 77° F. unless otherwise specified. The softening points are by the ring and ball method.

What we claim and desire to protect by Letters Patent is:

1. A composition comprising 100 parts of an asphaltite blended with between about 25 and about 150 parts by weight of a mixture of mineral oil and a normally liquid ester of a rosin acid, the said rosin acid liquid ester being in a quantity between about 10% and about 75% of the said oil-ester mixture.

2. A composition comprising 100 parts of gilsonite blended with between about 25 and about 150 parts by weight of a mixture of mineral oil and a normally liquid ester of a rosin acid, the said rosin acid liquid ester being in a quantity between about 10% and about 75% of the said oil-ester mixture.

3. A composition comprising 100 parts of gilsonite blended with between about 25 and about 150 parts by weight of a mixture of mineral oil and a lower aliphatic alcohol ester of a rosin acid, the said ester being in a quantity between about 10% and about 75% of the said oil-ester mixture.

4. A composition comprising 100 parts of gilsonite blended with between about 25 and about 150 parts by weight of a mixture of mineral oil and a methyl ester of a rosin acid, the said methyl ester being in a quantity between about 10% and about 75% of the said oil-ester mixture.

5. A composition comprising 100 parts of gilsonite blended with between about 25 and about 150 parts by weight of a mixture of mineral oil and methyl abietate, the methyl abietate being in a quantity between about 10% and about 75% of the said oil-methyl abietate mixture.

6. A composition comprising 100 parts of gilsonite blended with between about 25 and about 150 parts by weight of a mixture of mineral oil and methyl hydroabietate, the methyl hydroabietate being in a quantity between about 10% and about 75% of the said oil-methyl hydroabietate mixture.

7. A composition comprising 100 parts of gilsonite blended with between about 25 and about 150 parts by weight of a mixture of mineral oil and a triethylene glycol ester of a rosin acid, the said ester being in a quantity between about 10% and about 75% of the said oil-ester mixture.

8. A composition comprising an asphaltite and a resin in a quantity not more than about 30% by weight of the sum of the asphaltite and resin and for each 100 parts of asphaltite plus resin between about 25 and about 150 parts by weight of a mixture of mineral oil and a normally liquid ester of a rosin acid, the said rosin acid liquid ester being in a quantity between about 10% and about 75% of the said oil-ester mixture.

9. A composition comprising 100 parts of gilsonite blended with between about 25 and about 150 parts by weight of a mixture of mineral oil and a normally liquid ester of a rosin acid, the said rosin acid liquid ester being in a quantity between about 50% and about 75% of the said oil-ester mixture.

JOHN STROTHER MILLER.
JOHN L. PRESENT.